US 9,740,165 B2

(12) United States Patent
Yamaguchi et al.

(10) Patent No.: US 9,740,165 B2
(45) Date of Patent: Aug. 22, 2017

(54) DUST COLLECTING FILTER

(71) Applicant: CANON KABUSHIKI KAISHA, Tokyo (JP)

(72) Inventors: Yoshimasu Yamaguchi, Kawasaki (JP); Takashi Uno, Noda (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/671,780

(22) Filed: Mar. 27, 2015

(65) Prior Publication Data

US 2015/0277373 A1     Oct. 1, 2015

(30) Foreign Application Priority Data

Mar. 31, 2014   (JP) ................... 2014-072123

(51) Int. Cl.
  *G03G 21/20*     (2006.01)
  *B01D 46/10*     (2006.01)
  *B01D 46/00*     (2006.01)
  *B01D 46/52*     (2006.01)

(52) U.S. Cl.
  CPC ....... *G03G 21/206* (2013.01); *B01D 46/0002* (2013.01); *B01D 46/10* (2013.01); *B01D 46/521* (2013.01); *B01D 2265/028* (2013.01); *B01D 2279/45* (2013.01)

(58) Field of Classification Search
  None
  See application file for complete search history.

(56) References Cited

U.S. PATENT DOCUMENTS

| | | | | |
|---|---|---|---|---|
| 2,074,294 A | * | 3/1937 | Woodruff | B01D 46/10 |
| | | | | 55/493 |
| 3,881,250 A | * | 5/1975 | Frederickson | 30/383 |
| 4,549,887 A | * | 10/1985 | Joannou | 96/58 |
| 4,610,705 A | * | 9/1986 | Sarnosky et al. | 96/135 |
| 4,737,174 A | * | 4/1988 | Pontius | 96/138 |
| 4,978,375 A | * | 12/1990 | Il Yoo | 55/493 |
| 5,075,000 A | * | 12/1991 | Bernard et al. | 210/167.28 |
| 5,464,461 A | * | 11/1995 | Whitson et al. | 55/480 |
| 5,766,285 A | * | 6/1998 | Killman | 55/385.6 |

(Continued)

FOREIGN PATENT DOCUMENTS

| | | |
|---|---|---|
| CN | 2303673 Y | 1/1999 |
| CN | 1341036 A | 3/2002 |

(Continued)

*Primary Examiner* — Amber R Orlando
*Assistant Examiner* — Britanny Precht
(74) *Attorney, Agent, or Firm* — Canon U.S.A. Inc., IP Division

(57) ABSTRACT

A filter frame includes a first frame portion that includes a filter installation surface for installing a filter, a second frame portion that retains the filter by holding the filter between the first frame portion, and a hinge portion that connects the first frame portion and the second frame portion. The first frame portion has a plurality of fitting projections and an arm provided on a filter installation surface of the first frame portion so as to extend between a plurality of fitting projections. The second frame portion has a plurality of fitting portions for receiving the plurality of fitting projections, and a cutout provided in a side of the frame facing the side in which the second frame portion is connected to the first frame portion by the hinge portion.

11 Claims, 10 Drawing Sheets

(56) References Cited

U.S. PATENT DOCUMENTS

| | | | | |
|---|---|---|---|---|
| 5,797,975 | A * | 8/1998 | Davis | 55/493 |
| 6,297,950 | B1 * | 10/2001 | Erwin | 361/679.49 |
| 6,652,748 | B1 * | 11/2003 | Choi | 210/232 |
| 6,843,820 | B2 * | 1/2005 | Kubokawa | 55/495 |
| 6,860,916 | B2 * | 3/2005 | Kubokawa et al. | 55/495 |
| 6,955,702 | B2 * | 10/2005 | Kubokawa et al. | 55/499 |
| 7,169,202 | B2 * | 1/2007 | Kubokawa | 55/495 |
| 8,142,537 | B2 * | 3/2012 | Braithwaite et al. | 55/499 |
| 8,721,754 | B2 * | 5/2014 | Mann et al. | 55/480 |
| 2003/0070406 | A1 * | 4/2003 | Duffy | B01D 29/031 55/497 |
| 2003/0230063 | A1 * | 12/2003 | Kubokawa et al. | 55/497 |
| 2008/0184685 | A1 * | 8/2008 | Kempf et al. | 55/497 |
| 2009/0199526 | A1 * | 8/2009 | Wallace | 55/493 |
| 2012/0204523 | A1 * | 8/2012 | Woolard | 55/357 |
| 2013/0000489 | A1 * | 1/2013 | Lu | 96/222 |
| 2015/0013287 | A1 * | 1/2015 | Yamaguchi | B01D 46/521 55/491 |

FOREIGN PATENT DOCUMENTS

| | | |
|---|---|---|
| CN | 102397730 A | 4/2012 |
| CN | 103071348 A | 5/2013 |
| JP | H11-063597 A | 3/1999 |
| JP | 2007-516829 A | 6/2007 |

* cited by examiner

DUST COLLECTING FILTER

BACKGROUND OF THE INVENTION

Field of the Invention

The present invention relates to a structure of a dust collecting filter provided, for example, at an exhaust duct in an image forming apparatus.

Description of the Related Art

An electrophotographic image forming apparatus is described as an example. In an apparatus main body of the image forming apparatus, electrical components, such as a plurality of motors, a fan, a power board, and a heater, are provided as components (e.g., unit configurations) for conveying sheets as recording media, forming an image, and then discharging a product.

The electrical components, such as motors, an electric board and a heater, generate heat from electrical component main bodies when they are driven to operate. The generated heat is accumulated in the apparatus main body to rise a temperature in the apparatus main body. The temperature rise may cause, for example, thermal deformation of components, such as a sheet conveyance guide made of plastic, disposed inside the apparatus main body. The thermal deformation may cause paper jam of conveyed sheets.

In some environments in which the image forming apparatus is installed, dust may be collected inside the apparatus main body, or dust may rise and fly due to, for example, vibration by the operation of the apparatus and airflow of the fan. Such dust may adhere, for example, to a surface of a sheet and cause a missing image when an image is transferred to the sheet. As a result, image quality may be reduced due to an image defect.

Then, a fan and a duct for purifying air inside and exhausting air (exhausting heat) from the apparatus main body are typically provided, and a filter for collecting dust is installed in a path of the duct.

PCT Japanese Translation Patent Publication No. 2007-516829 discloses the following filter assembly. A filter is installed in a base frame that has an installation portion for installing a pleat-shaped filter. A cover frame formed integrally with the base frame by a hinge is made to pivot about the hinge, and the filter is held between the base frame and the cover frame. Then, a projection for fitting provided in the cover frame is made to fit in a cantilever pillar member having a fitting hole provided in the base frame to close the base frame and the cover frame.

With this opening/closing configuration of the base frame and the cover frame, the filter that has caught dust and become unclean may be removed. Since the filter may be replaced with a new filter, a replacement operation at the time of maintenance may be simplified, which is advantageous.

Japanese Patent Laid-Open No. 11-63597 discloses the following filter assembly. That is, a plate-shaped filter is installed in a first frame on a side on which a filter having a cross flame is provided. A second frame formed integrally with the first frame by a hinge for holding the filter is folded about the hinge onto the first frame. A latching projection provided in the first frame latches a frame (i.e., a thin board) of the second frame. An engagement protrusion is provided in the second frame. An engaging hole of a bent piece formed integrally with the first frame by a hinge is folded about the hinge so that the engagement protrusion engages the engaging hole of the bent piece.

The filter assembly is thus obtained.

In the past, the entire filter assembly in which the frame and the filter are integrated with each other are replaced with a new filter assembly. With this filter configuration, however, the filter that has become unclean may be replaced with a new filter and, therefore, the running cost may be reduced.

The filter frame includes a latching projection that latches the filter frame not to open when the filter frame is closed. If the projections are provided on three sides of the filter frame other than the side on which the hinge is provided, it is required to release the latch of each of the three sides to open and close the filter frame when the filter is to be replaced.

In the filter assembly disclosed in PCT Japanese Translation Patent Publication No. 2007-516829, at the periodic replacement of an unclean filter, it is required to release the fitting, one by one, of the cantilever pillar member having the engaging hole provided in the base frame of the filter case from the engagement protrusion provided in the cover frame. Therefore, there is a problem that taking the unclean filter from the filter case takes time and labor.

In the filter structure disclosed in Japanese Patent Laid-Open No. 11-63597, when a new filter is installed in the filter case, the filter frame is made to fit by the fitting projection and the frame. After this operation, the bent piece having the engaging hole is further folded about the hinge so that the engaging hole is made to engage the engagement protrusion provided in the frame. The filter frame is thus assembled. When the unclean filter is removed, the above operation is performed in the reverse order. As described above, since a plurality of engaging portions need to be engaged or disengaged one by one, there is a problem that such operations take labor and time.

SUMMARY OF THE INVENTION

The present invention is made in view of the problems of the related art. An object of the present invention is to provide a dust collecting filter with improved operability in opening/closing a filter frame that retains a filter.

An exemplary configuration of a dust collecting filter according to the present invention to solve the above problems is a filter frame for containing a dust collecting filter, which includes: a first frame portion that includes a filter installation surface on which the filter is installed, and side surfaces standing up from each side of the installation surface and facing side surfaces of the filter, and forms a container portion that contains the filter, wherein the filter installation surface has an opening through which a first surface of the filter is exposed and a second frame portion that includes a filter press portion for retaining the filter by holding the filter installation surface and the filter, wherein the second frame portion has an opening through which a second surface of the filter is exposed; and a hinge portion that connects the first frame portion and the second frame portion so as to be openable, closable, and pivotable, latching portions provided in the first frame portion and causes the first frame portion and the second frame portion to be latched, each of the latching portions being provided in each side of a pair of mutually facing frames that adjoin the side in which the hinge portion is provided; and latched portions provided in the second frame portion and are latched by the latching portions, wherein the first frame portion includes an arm provided in the filter installation surface so as to extend between the central portion of a pair of front and rear sides of the frames (arm portion), and either one of the first frame portion or the second frame includes a recess provided in a side of the frame facing the side of the frame in which the first frame portion is connected to the second frame portion by the hinge portion, and with which inside of the side surface of the first frame is accessible.

Further features of the present invention will become apparent from the following description of exemplary embodiments with reference to the attached drawings.

DESCRIPTION OF THE EMBODIMENTS

Figure 2:
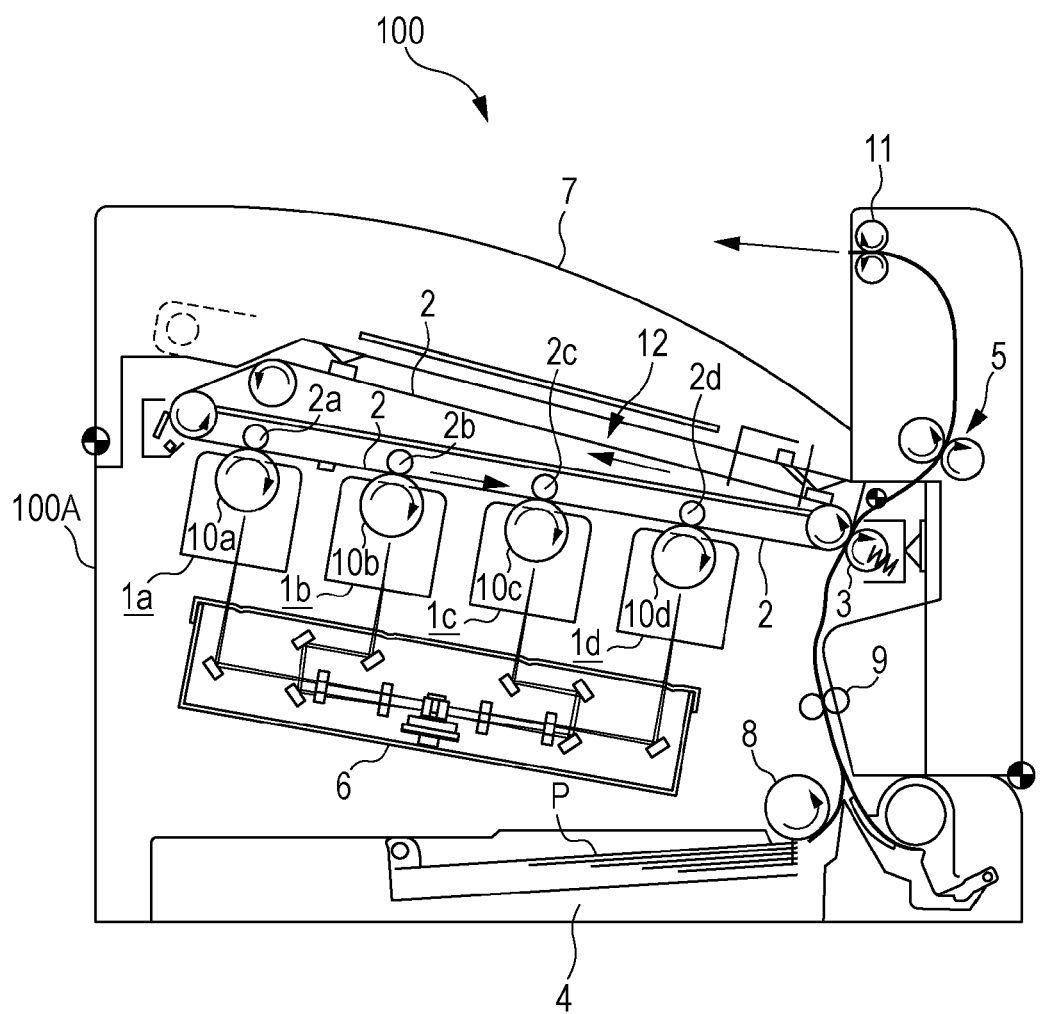
FIG. 2 is a schematic diagram of a structure of an image forming apparatus in an embodiment.

Hereinafter, embodiments of the present invention are described with reference to the accompanying drawings.
First Embodiment
(1) Description of Exemplary Image Forming Apparatus FIG. 2 is a schematic diagram of an entire structure of an image forming apparatus 100 according to the present embodiment. First, an image formation process is described. The example of the image forming apparatus of FIG. 2 is illustrative only and not restrictive. The image forming apparatus 100 is a full color (4 colors) intermediate transfer electrophotographic image forming apparatus. First to fourth four electrophotographic photosensitive drums 10a to 10d for forming toner images of each color of yellow (Y), magenta (M), cyan (C), and black (K) are tandemly arranged from the left to the right in the drawing at the central portion in an apparatus main body 100A.

Around each of the drums 10a to 10d, electrophotographic image formation process units (not illustrated), such as a charging unit, a developing unit, and a cleaner, are disposed. A process unit that acts on each drum is unitized as each of process cartridges (hereafter, referred to as cartridges) 1a to 1d that is removably attached to the apparatus main body 100A.

An intermediate transfer belt unit 12 is disposed above the cartridges 1a to 1d. An underside of an intermediate transfer belt (hereafter, referred to as an ITB) 2 at a lower running portion in the unit 12 is in contact with an upper surface of each of the drums 10a to 10d. Inside the ITB 2, four primary transfer rollers 2a to 2d each of which faces an upper surface of each of the drums 10a to 10d via the ITB 2 are disposed.

Each of the drums 10a to 10d is rotated clockwise in the direction of arrow at a predetermined peripheral speed, and is uniformly charged at a predetermined polarity and to a potential by a charging unit. Each of the drums 10a to 10d is exposed to an optical image of each of separated color of Y, M, C and K from an exposure device 6. Thus, a latent image (i.e., an electrostatic latent image) corresponding to a Y color component image, an M color component image, a C color component image, and a K color component image of the color image is formed on each of the drums 10a to 10d. Each latent image is developed by a developing unit to form each of Y, M, C, and K toner images on each of the drums 10a to 10d.

The ITB 2 is rotated counterclockwise (i.e., a forward direction of the rotation of the drums 10a to 10d) in the direction of arrow at substantially the same peripheral speed as the peripheral speed of the drums 10a to 10d. When the drums 10a to 10d are rotated, each of the toner images reaches a primary transfer portion at which the ITB 2 is brought into contact with the drums 10a to 10d. The toner images are transferred sequentially to the moving ITB 2 in an overlapped manner by the primary transfer rollers 2a to 2d. That is, a toner image in which four colors of Y, M, C, and K are superimposed is formed on the ITB 2. Predetermined primary transfer bias is applied to the primary transfer rollers 2a to 2d from an electronic circuit board (not illustrated).

Sheets (i.e., recording media: recording materials, paper sheets) P contained in a sheet cassette 4 are sent out one at a time by a pickup roller 8. After timing is adjusted by a resist roller 9, the sheet P is conveyed to a secondary transfer nip portion that is formed by a secondary transfer roller 3 and the ITB 2. In the secondary transfer nip portion, a toner image on the ITB 2 in which four colors are superimposed is transferred at a time to the sheet P.

Then, the sheet P to which the toner image is transferred is conveyed to a fixing unit 5, where the toner image is fixed with heat and pressure. In this manner, toner of each color is melt and mixed and is fixed to the sheet P to provide a full color print image. The sheet P that leaves the fixing unit 5 is discharged onto a discharge tray 7 by a discharge conveying unit 11 provided in the downstream of the fixing unit 5 in a sheet conveying direction.

Arrangement of components in the apparatus main body 100A is described. In the image forming apparatus 100 according to the present embodiment, the sheet cassette 4, the exposure device 6, the cartridges 1a to 1d, the intermediate transfer belt unit 12, and the discharge tray 7 are arranged in this order from below to above in the apparatus main body 100A.

Figure 3A:
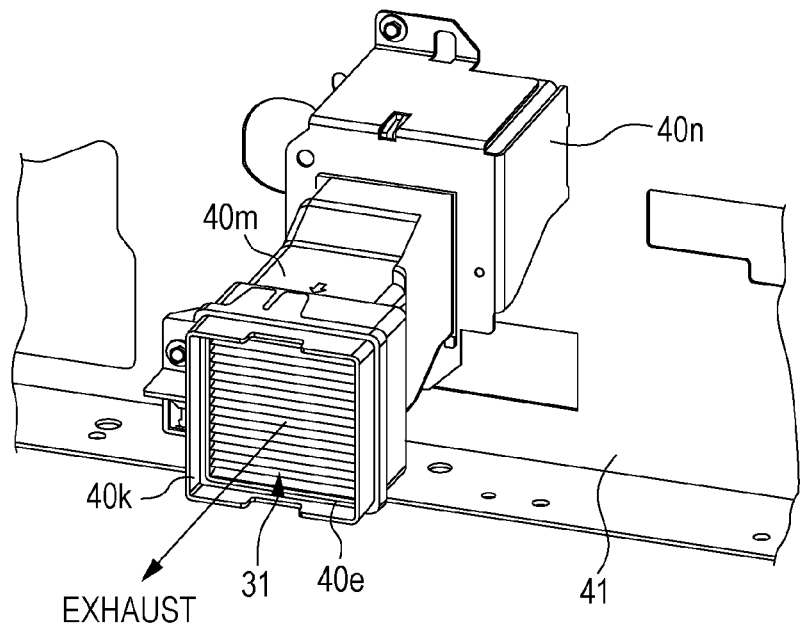
FIG. 3A is a perspective view of an exhaust duct portion in an image forming apparatus.

The exhaust duct is disposed in the image forming apparatus 100 to purify air in and exhaust heat from the apparatus main body 100A. FIG. 3A is a perspective view of the exhaust duct of the image forming apparatus 100 according to the present embodiment. An exhaust duct 40m is provided in a side plate 41 of the apparatus main body 100A via a duct support plate 40n. A filter case 40k is provided at a free end portion (i.e., an end portion on the opposite side of the duct support plate 40n) of the exhaust duct 40m. A dust collecting filter (i.e., a dust collecting filter assembly) 31 is inserted and provided in an inner periphery of the filter case 40k via a gap filling member 40e.

Air in the apparatus main body 100A is introduced in the exhaust duct 40m by a fan (not illustrated), and is exhausted through the dust collecting filter 31 outside the apparatus main body 100A. Thus, dust included in exhaust is collected by a filter 32 of the dust collecting filter 31 and air is purified, and heat is exhausted so that temperature rise inside the apparatus is prevented.

The gap filling member 40e is made of a soft material, such as sponge, and is provided on an outer peripheral surface of the dust collecting filter 31 as illustrated in FIG.

3B. The dust collecting filter 31 is fit in the inner periphery of the filter case 40k of the exhaust duct 40m against elasticity of the gap filling member 40e. Since the gap between the inner periphery of the filter case 40k and the outer peripheral surface of the dust collecting filter 31 is filled by the gap filling member 40e, leakage of dust from the outer peripheral portion of the dust collecting filter 31 is prevented.

(2) Dust Collecting Filter

Since the image forming apparatus 100 is a multifunctional apparatus with a large number of components, the apparatus has become large in size and become high in speed. Therefore, the apparatus main body 100A has an increasingly large number of electrical components that become heat sources and contribute temperature rise in the apparatus main body 100A. Thus, higher exhaust efficiency in the exhaust duct is required.

Since vibration in the apparatus main body 100A caused by the increase in speed has also become large, the amount of dust flying inside the apparatus main body 100A further increases. Therefore, higher dust collecting efficiency of a dust collecting component (i.e., the dust collecting filter) in the exhaust duct is required.

In order to achieve higher exhaust efficiency and dust collecting efficiency of the exhaust duct required by the increase in size and speed of the multifunctional apparatus, periodic maintenance of the dust collecting component, i.e., periodic replacement of the dust collecting filter, is indispensable. Since the frequency of replacement of the unclean filter that has collected dust increases, it is required to enhance ease of installation of the filter and operability of, for example, replacement, the filter.

The dust collecting filter 31 of the present embodiment has enhanced ease of installation and operability of, for example, replacement of the filter as compared with the filter 32. Hereinafter, the dust collecting filter 31 is described in detail. The dust collecting filter 31 is an assembly of a sheet-shaped filter (i.e., a filter medium) 32 for collecting dust and a filter frame 40 in which the filter 32 is installed.

Figure 1:
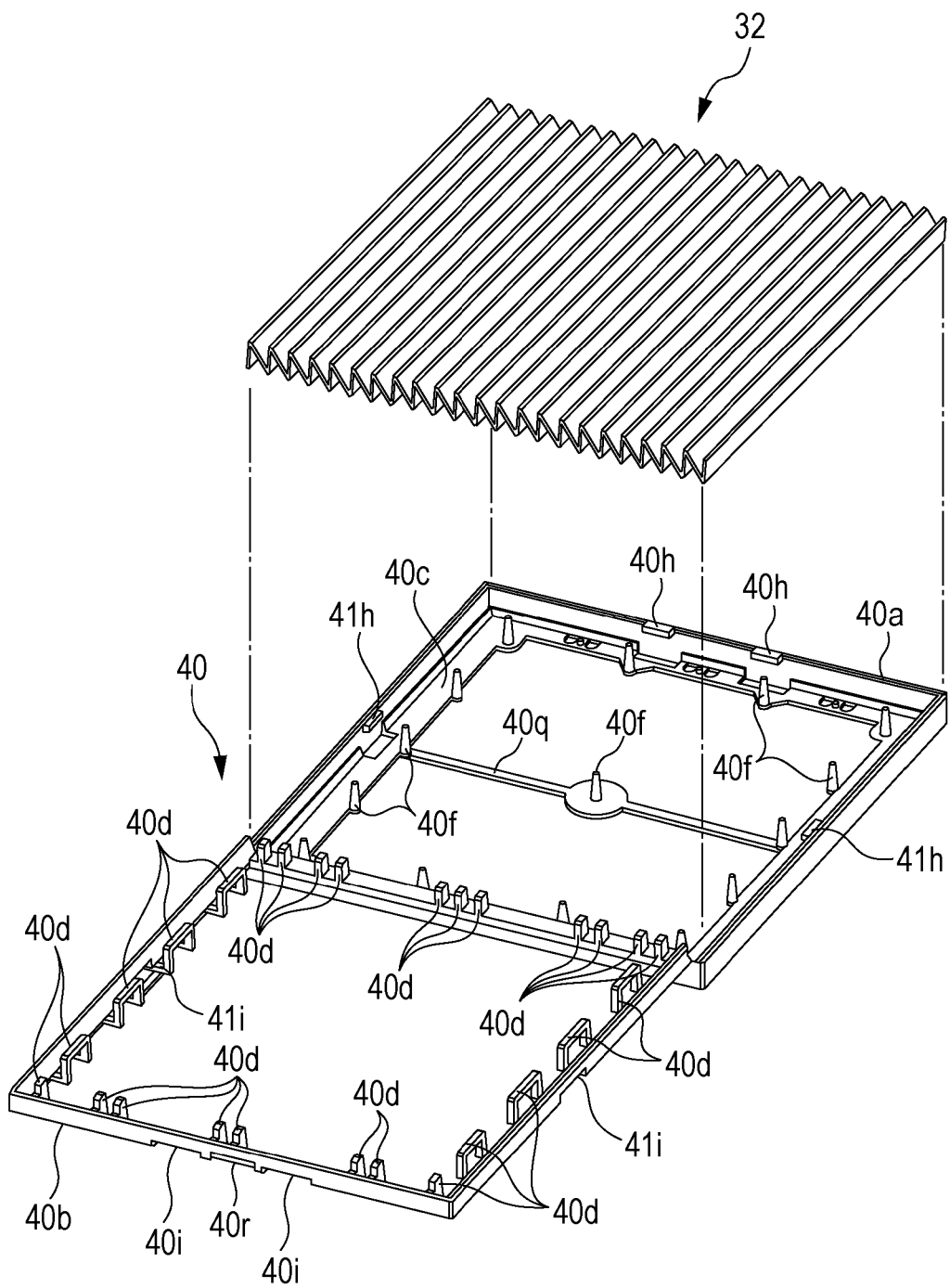
FIG. 1 is an exploded perspective view of a filter and a filter frame of a dust collecting filter in an embodiment.
Figure 4:
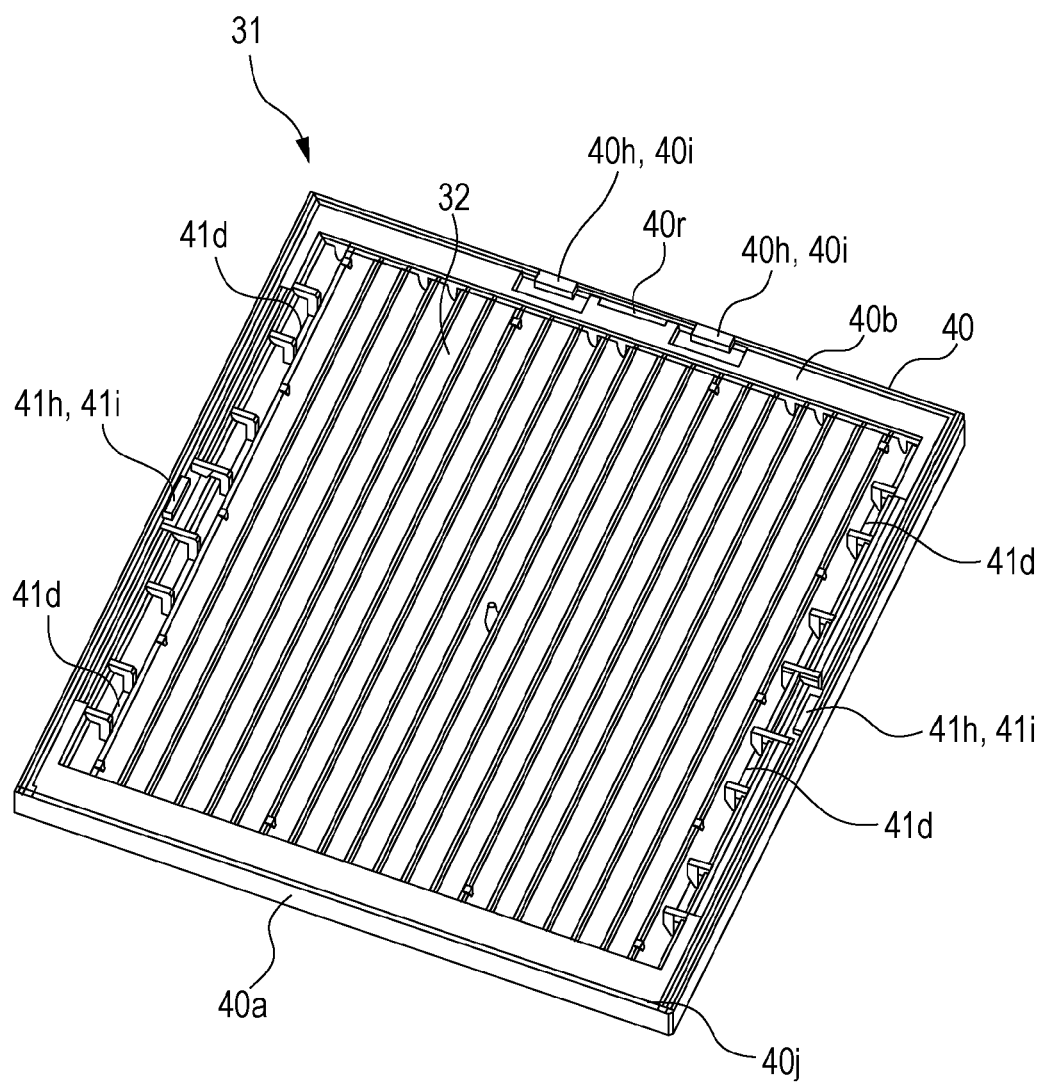
FIG. 4 is a perspective view, seen from the front, of a dust collecting filter in an assembled state.
Figure 5:
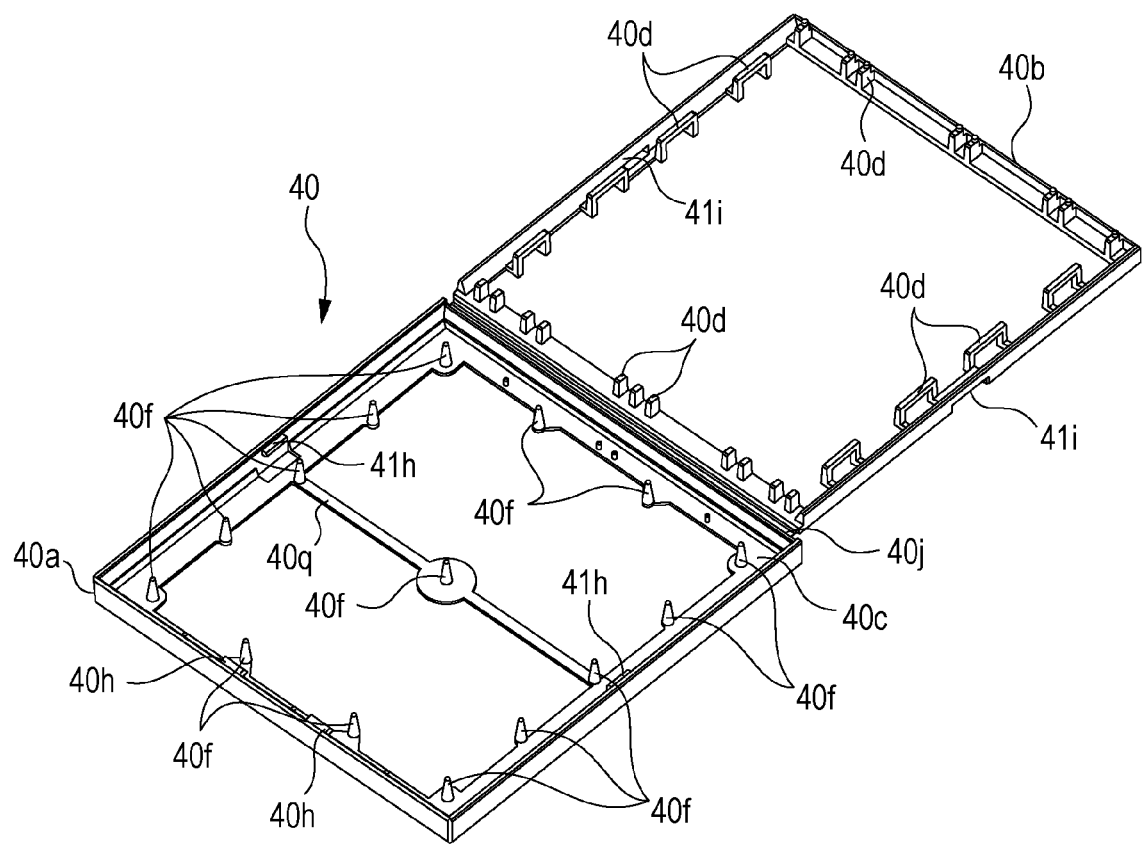
FIG. 5 is a perspective view, seen from an inner side, of a filter frame in an open state.
Figure 6:
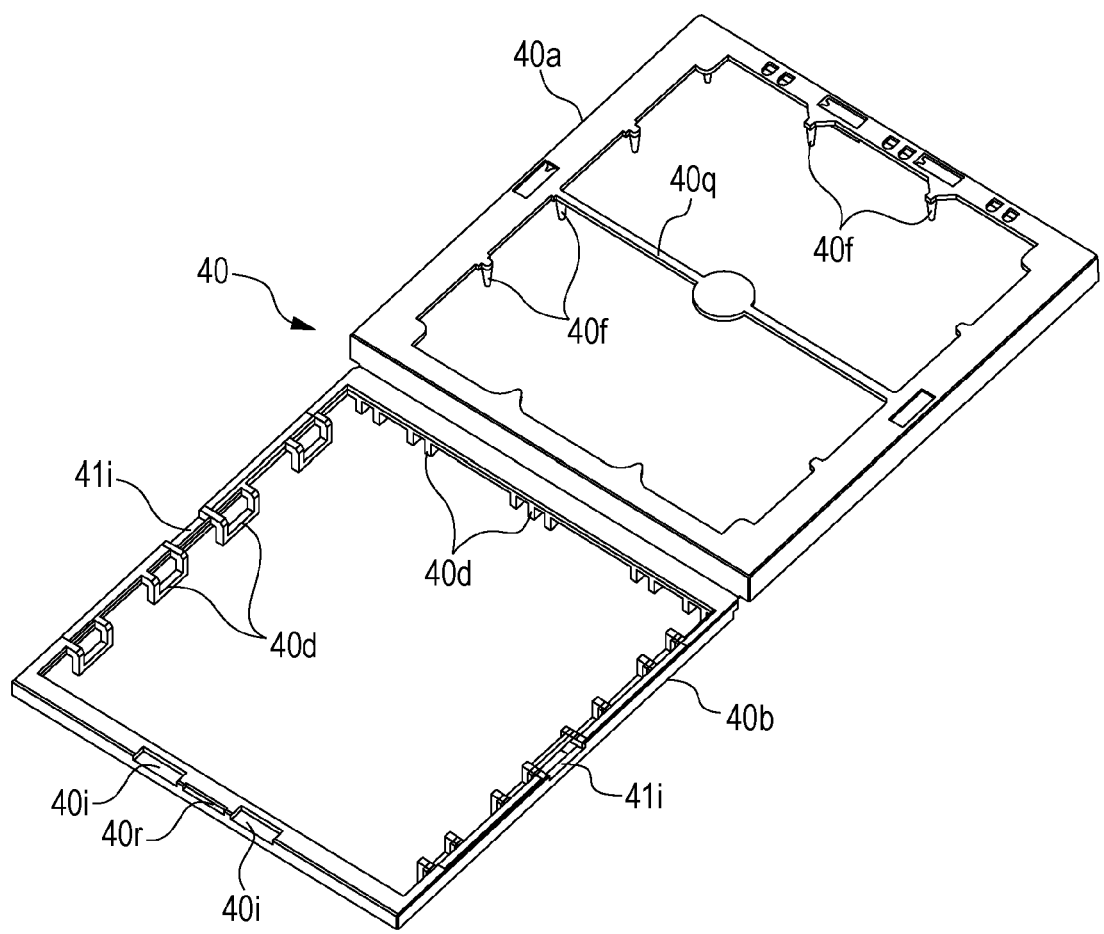
FIG. 6 is a perspective view, seen from an outer side, of a filter frame in an open state.

FIG. 1 is an exploded perspective view of the filter 32 and the filter frame 40 of the dust collecting filter 31 in an embodiment. FIG. 4 is a perspective view, seen from the front, of the dust collecting filter 31 in an assembled state. FIG. 5 is a perspective view, seen from an inner side, of the filter frame 40 in an open state. FIG. 6 is a perspective view, seen from an outer side, of the filter frame 40 in an open state.

The filter 32 in the present embodiment is a rectangular (or substantially square) sheet-shaped member made of a pleated, flexible elastic fibrous material. The material is typically nonwoven web. Alternatively, textile web and knitting web may also be used. The pleated filter 32 has a triangular pleated shape with accordion folding. The peaks of the accordion folding may be sharp or rounded. The filter 32 may be a thin flat-shaped filter that is not pleated. In the present embodiment, the pleated filter 32 as described above is used.

The filter frame 40 in the present embodiment is an injection molded product made of a plastic resin material, such as polypropylene and nylon. The filter frame 40 has a first frame portion 40a and a second frame portion 40b. The first frame portion 40a and the second frame portion 40b are connected by a hinge portion 40j to pivot to open and close.

In the present embodiment, the first frame portion 40a has a rectangular (or substantially square) frame shape. A filter installation surface 40c on which the filter 32 is installed is provided on an inner peripheral bottom surface of the first frame portion 40a. The filter installation surface 40c includes positioning projections 40f for installing and positioning the filter 32. The first frame portion 40a has side surfaces standing up from each side of the filter installation surface 40c and facing side surfaces of the filter, and forms a container portion that contains the filter.

The second frame portion 40b also has a rectangular (or substantially square) frame shape substantially corresponding to that of the first frame portion 40a. The second frame portion 40b includes filter press portions 40d for retaining the filter 32 by holding the first frame portion 40a and the filter 32.

The first frame portion 40a and the second frame portion 40b may be made to pivot about the hinge portion 40j to open and close. As illustrated in FIG. 4, the second frame portion 40b may be fit into the first frame portion 40a (i.e., a close state of the filter frame 40). In the close state, the second frame portion 40b fits into an inner periphery of the first frame portion 40a. As illustrated in FIG. 1, the second frame portion 40b may also be open from the first frame portion 40a (an open state of the filter frame 40).

The first frame portion 40a includes a plurality of fitting projections 40h and 41h at which the second frame portion 40b fits (engages, latches) into the first frame portion 40a when the second frame portion 40b is made to pivot about the hinge portion 40j to be folded onto the first frame portion 40a. The second frame portion 40b includes a plurality of fitting portions 40i and 41i for receiving each of the fitting projections 40h and 41h.

In the present embodiment, the fitting projections 40h and 41h are provided in three inner peripheral sides of the first frame portion 40a other than the side that is in contact with the hinge portion 40j. That is, the fitting projections 40h and the fitting portions 40i corresponding to the fitting projections 40h are provided in all the sides of the frame other than the side in which the first frame portion 40a and the second frame portion 40b are connected by the hinge portion 40j.

In particular, in the first frame portion 40a, two fitting projections 40h are provided with a space therebetween at the central portion in the longitudinal direction of a side of the frame opposite to the side in which the hinge portion 40j is provided. One fitting projection 41h is provided at the central portion in the longitudinal direction of each of the two sides of the frame facing each other and extending vertically to the hinge portion 40j from both longitudinal end portions of the side of the frame in which the hinge portion 40j is provided.

In the second frame portion 40b, two fitting portions 40i corresponding to the two fitting projections 40h are provided in a side of the frame opposite to the side in which the hinge portion 40j is provided. Two fitting portions 41i corresponding to the fitting projections 41h are provided in each of the two sides of the frame facing each other and extending vertically to the hinge portion 40j from both longitudinal end portions of the side of the frame in which the hinge portion 40j is provided.

The second frame portion 40b includes a cutout 40r provided in a side of the frame facing the side of the frame in which the second frame portion 40b is connected to the first frame portion 40a by the hinge portion 40j. The cutout 40r is provided at a position between the first frame portion 40a and the second frame portion 40b and at which inside of the side surface of the first frame portion 40a is accessible with a tool, such as a screwdriver. The cutout 40r is located between the two fitting portions 40i and is used to open the filter frame 40 for the replacement of the unclean filter 32 of the dust collecting filter 31 by inserting a tool, such as a finger and a screwdriver, and causing the inside of the side surface of the first frame 40a to bend.

Figure 7A:
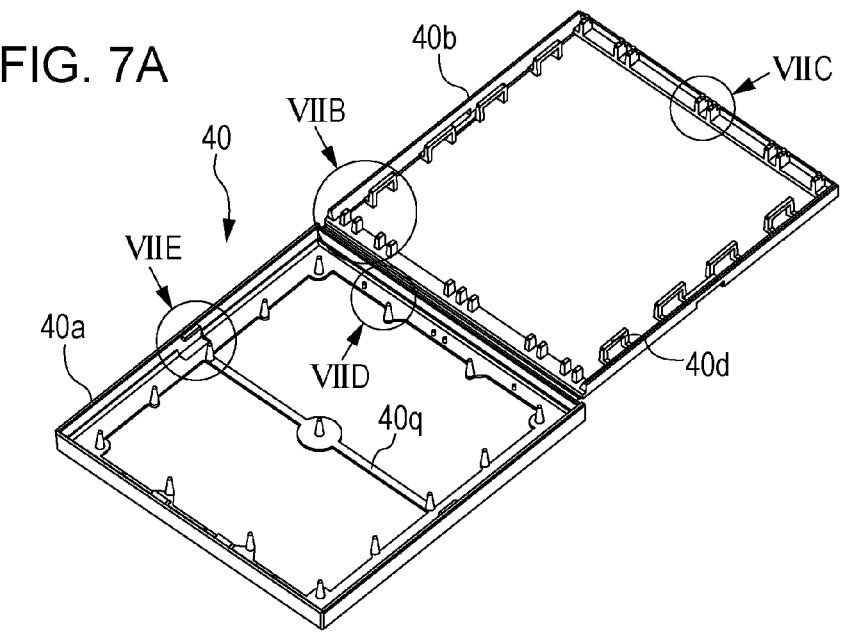
FIGS. 7A to 7E are partial detailed views (first) of a filter frame.
Figure 7B:
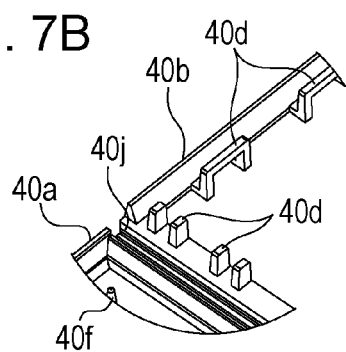

FIGS. 7B to 7E are detailed views (enlarged views) of the portions VIIB to VIIE of the filter frame 40 surrounded with circles illustrated in FIG. 7A. As illustrated in FIG. 7B, the hinge portion 40j is provided on an upper portion of the outer peripheral surface of the first frame portion 40a in a thickness direction to a peripheral frame. Thus, as illustrated in FIG. 4, the hinge portion 40j does not protrude from the outer peripheral surface of the first frame portion 40a when the dust collecting filter 31 is assembled.

Figure 7C:
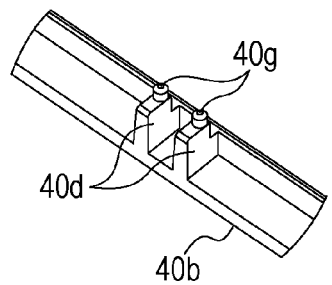

As illustrated in FIG. 7C, a press protrusion 40g is provided at a tip of each of the filter press portions 40d provided the side of the frame of the second frame portion 40b opposite to the hinge 40j. Thus, filter holding force may further be increased by the press protrusions 40g that press the filter 32 held by the filter installation surface 40c and the filter press portion 40d. The press protrusions 40g are provided only in the side of the frame of the second frame portion 40b opposite to the hinge 40j in the present embodiment. However, the press protrusions 40g may be provided at the tip of every filter press portion 40d provided in the sides other than the side described above.

Figure 7D:
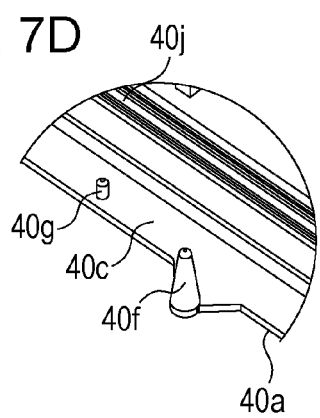

As illustrated in FIG. 7D, the positioning projections 40f are cylindrical projections that penetrate the filter 32 to install and position the same. Each of the positioning projections 40f has a conical shape with a round tip in the present embodiment. However, the positioning projections 40f may be a prism shape, a sharp pointed conical shape, a quadrangular pyramid shape, a triangular pyramid shape, and a columnar shape.

Figure 7E:
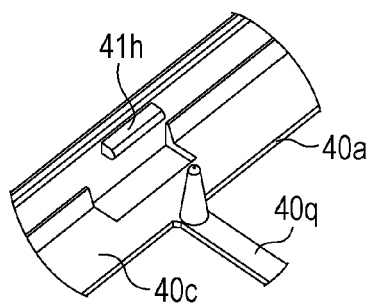

FIG. 7E illustrates the fitting projection 41h for causing the second frame portion 40b and the first frame portion 40a to fit each other. The fitting projection 41h is provided also in the side of the frame of the first frame portion 40a opposite to the side in which the fitting projection 41h is provided. The fitting portions 41i in the second frame portion 40b are provided in the same manner. Thus, the filter 32 held by the filter installation surface 40c and the filter press portion 40d is fit, by the fitting projections 40h and the fitting portions 40i, in all the sides of the frame other than the side of the frame connected by the hinge portion 40j. Therefore, the filter retaining force may be kept all the time.

An arm 40q is provided in the filter installation surface 40c so as to extend between the fitting projections 41h provided in the two facing sides of the frame extending vertically to the hinge portion 40j from both longitudinal end portions of the side of the frame in which the hinge portion 40j is provided.

The arm 40q is provided to release the fitting of the fitting projections 41h cooperatively when the fitting of the fitting projections 40h of the first frame portion 40a is released and the second frame portion 40b is opened. Details thereof are described later.

Figure 8A:
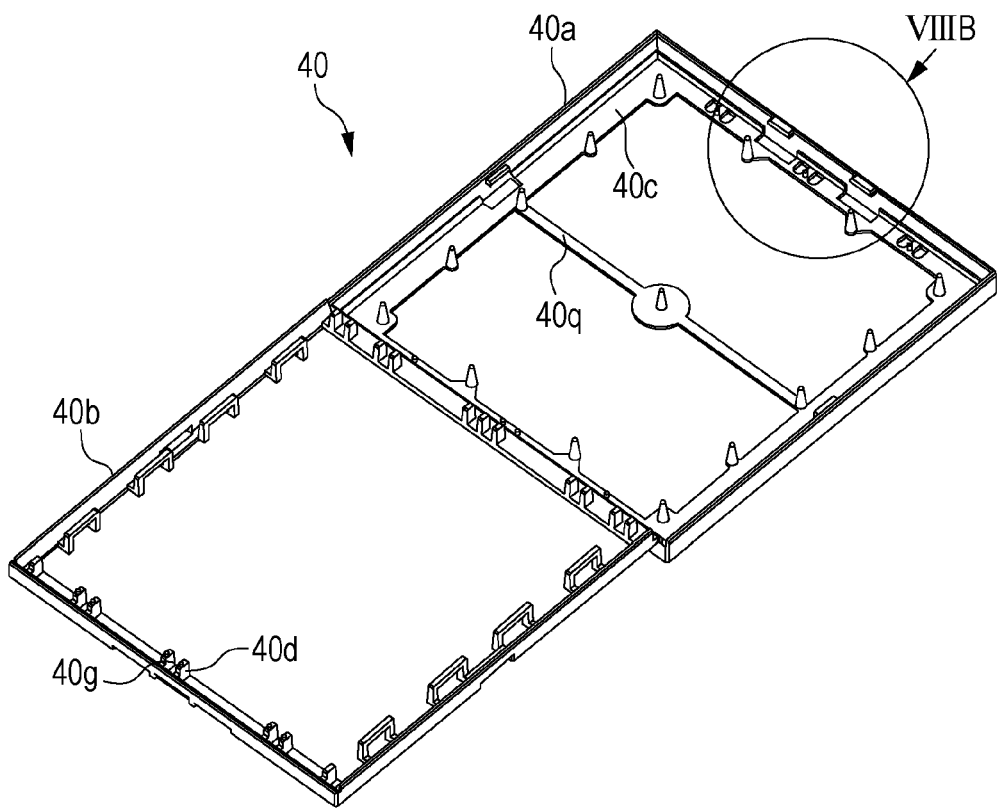
FIGS. 8A and 8B are partial detailed views (second) of a filter frame.
Figure 8B:
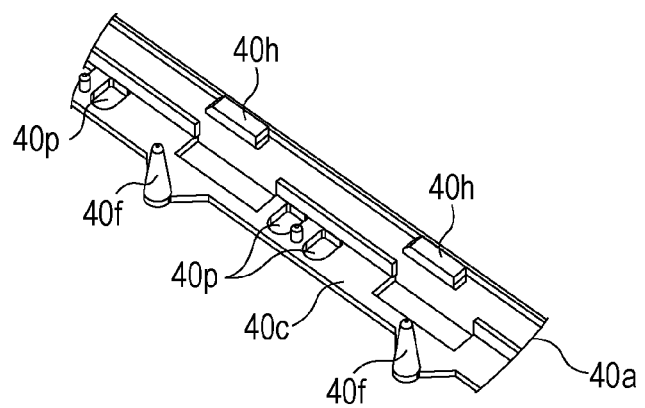

FIG. 8B is a detailed view (an enlarged view) of a portion VIIIB of the filter frame 40 surrounded with a circle in FIG. 8A. As illustrated in FIG. 8B, holes 40p are provided in the filter installation surface 40c provided in the first frame portion 40a so that the press protrusions 40g provided at the tips of the filter press portions 40d illustrated in FIG. 7C do not interfere with the filter installation surface 40c.

Next, a process of assembling the dust collecting filter 31, and a process of replacing the unclean filter 32 are described in this order with reference to FIGS. 9A to 9C, 10A and 10B.

Figure 9A:
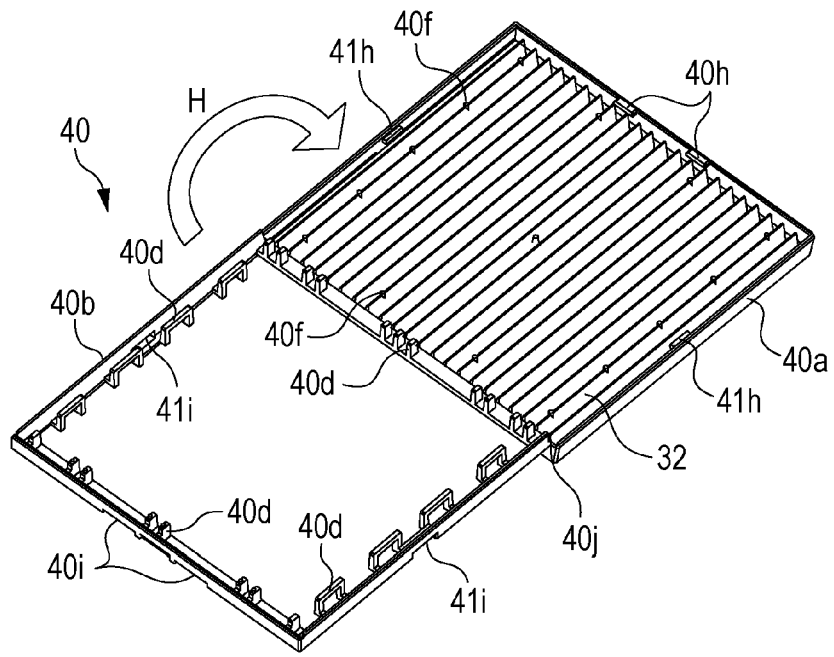
FIGS. 9A to 9C are explanatory views of assembly of a dust collecting filter and replacement of a filter.

As illustrated in FIG. 9A, the filter 32 is installed and positioned in the first frame portion 40a of the filter frame 40. At this time, the filter 32 is disposed so that an outer shape thereof is disposed inside the four sides of the first frame portion 40a. The filter 32 is installed in the filter installation surface 40c provided on the inner peripheral bottom surface of the first frame portion 40a so that the positioning projections 40f provided on the filter installation surface 40c penetrate the peaks of the filter 32.

In this manner, the filter 32 is placed inside the first frame portion 40a and positioned by the positioning projections 40f without misalignment. Therefore, since the filter 32 is not partially protrude from the filter frame 40 and is not misaligned, leakage of dust particles and a decrease in dust collecting efficiency may be prevented. It is useful for the efficient assembly to add a mark, such as an arrow, (not illustrated) to the filter installation surface 40c at the time of forming the first frame portion 40a at the time of forming so that the filter 32 is installed with the pleat direction being right.

Then, the second frame portion 40b is made to pivot in the direction of white arrow H about the hinge portion 40j with respect to the first frame portion 40a, and is closed. The second frame portion 40b fits into the inner periphery of the first frame portion 40a. Then, the fitting projections 40h and 41h provided in the first frame portion 40a as described above with reference to FIGS. 1, 5 and 6 are made to fit in the fitting portions 40i and 41i provided in the second frame portion 40b, respectively. The dust collecting filter 31 as illustrated in the front views of FIG. 4 and FIG. 9B is thus completed.

Thus, the second frame portion 40b is made to pivot about the hinge portion 40j with respect to the first frame portion 40a to assembly the frame and, at the same time, the first frame portion 40a and the second frame portion 40b are made to fit each other. That is, the fitting projections 40h and 41h are made to fit into the fitting portions 40i and 41i provided to correspond to one another in the first frame portion 40a and the second frame portion 40b. Therefore, the installation operation is simplified and operation time is shortened.

The procedure for installing the completed dust collecting filter 31 in the exhaust duct 40m (see FIGS. 3A and 3B) is as described above. In the present embodiment, the front side of the dust collecting filter 31 is the side of the second frame portion 40b. The dust collecting filter 31 is installed in the filter case 40k with the front side facing outside (i.e., the downstream side of the exhaust). The dust collecting filter 31 may be installed in the filter case 40k with its front surface and back surface facing any of the directions.

Figure 9B:
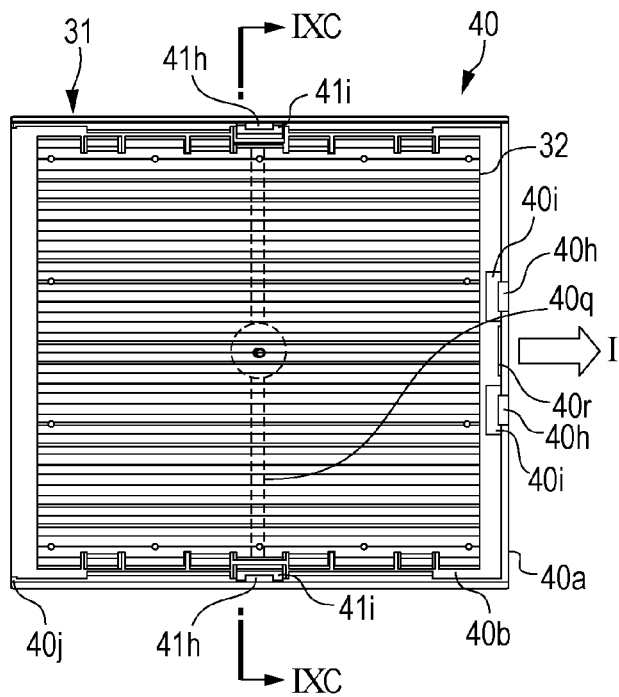
Figure 9C:
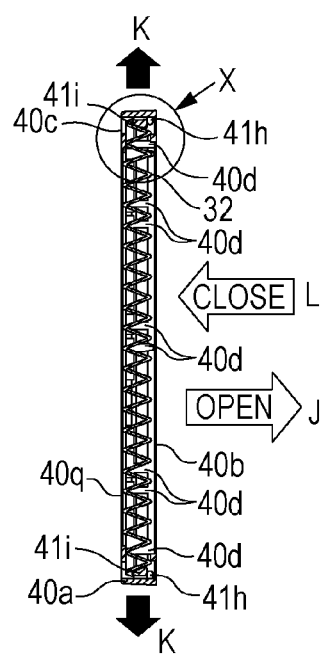
Figure 10A:
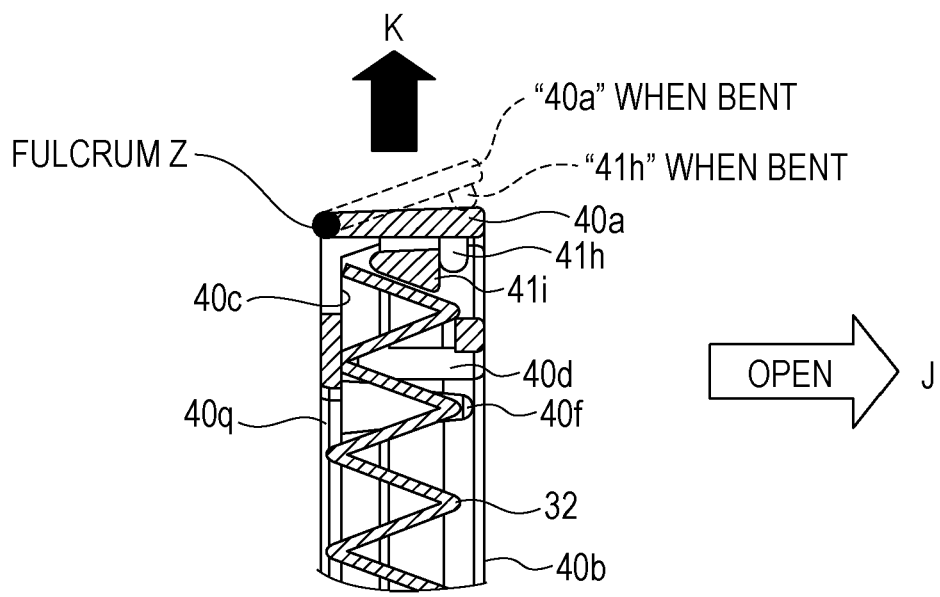
FIGS. 10A and 10B are explanatory views of opening of a filter frame.
Figure 10B:
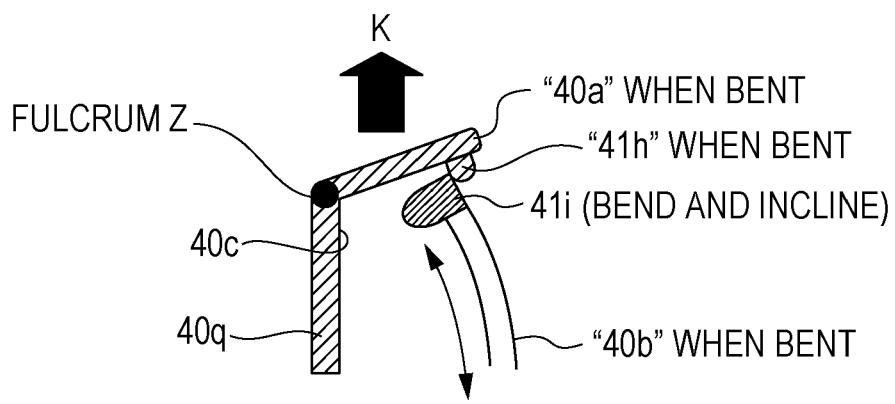

FIG. 9C is a cross-sectional view of the dust collecting filter 31 along line IXC-IXC of FIG. 9B. FIG. 10A is a detailed view (an enlarged view) of the portion X surrounded with a circle in FIG. 9C. FIG. 10B is an explanatory view explaining the operation of that portion. A procedure for replacing an unclean used filter 32 in the dust collecting filter 31 is described with reference to FIGS. 9B, 9C, 10A and 10B.

To replace the unclean filter 32 that has collected dust after the dust collecting filter 31 installed in the exhaust duct 40m is used, the dust collecting filter 31 fit in and installed in the filter case 40k of the exhaust duct 40m is removed. The gap filling member 40e is adhered to the dust collecting filter 31 using a double-sided tape and is removed together with the dust collecting filter 31.

As illustrated in the front view of the dust collecting filter 31 of FIG. 9B, a tip of a screwdriver, tweezers, a finger, for example, is inserted in the cutout 40r, and force is applied so that the first frame portion 40a is bent in the direction of white arrow I. At this time, engagement between the two fitting projections 40h and the two fitting portions 40i is released (i.e., the fitting projections 40h are moved out of the fitting portions 40i). Then the second frame portion 40b is made to pivot about the hinge 40j in the direction J to open from the first frame portion 40a.

In more detail, as illustrated in the cross-sectional view of the dust collecting filter 31 of FIG. 9C, the second frame portion 40b is lifted and bent in the open direction of white arrow J using a tip of a screwdriver, tweezers, or a finger inserted in the cutout 40r. Then the fitting portion 41i is inclined to lift the fitting projections 41h and ride on the hemisphere shaped end portions of the fitting projections 41h, and the first frame portion 40a is bent outside in the direction of black arrow K of FIG. 9C. Then engagement between the fitting projections 41h and the fitting portions 41i is released, the second frame portion 40b is unlatched from the first frame portion 40a, and the filter frame 40 is opened.

In further detail, as illustrated in the detailed views G (first) and (second) of FIGS. 10A and 10B, the fitting portions 41i are inclined when the second frame portion 40b is lifted and bent in the open direction J as described above. The thus bent and inclined fitting portions 41i push the fitting projections 41h up, ride the hemisphere shaped end portions of the fitting projections 41h up and push the fitting projections 41h away. Since the first frame portion 40a is bent at the fulcrum Z outside in the direction of black arrow K, engagement between the fitting projection 41h and the fitting portion 41i is released without performing any disengagement operation.

That is, in the detailed views G (first) and (second) of FIGS. 10A and 10B, the first frame portion 40a is bent at the fulcrum Z as illustrated by the dotted line in the detailed view G (first), or in the detailed view G (second). Therefore, engagement between the fitting projections 41h and the fitting portions 41i is released automatically without requiring release of fitting.

The reason is that the filter installation surface 40c on the inner peripheral bottom surface of the first frame portion 40a is connected by the arm 40q so as to extend from one fitting projection 41h to another fitting projection 41h. As described above, the arm 40q is provided on the filter installation surface 40c so as to extend between the fitting projections 41h provided in the two facing sides of the frame extending vertically to the hinge portion 40j from both longitudinal end portions of the side of the frame in which the hinge portion 40j is provided.

Since the arm 40q is provided, even if the first frame portion 40a is to be bent at the fulcrum Z, the first frame portion 40a cannot be bent in the direction of arrow K because the first frame portion 40a pulls the arm 40q with the opposite first frame portion 40a from both ends.

In this manner, a tool or a finger used as a trigger for opening the filter frame 40 is inserted in the cutout 40r to cause the second frame portion 40b to bend and open. Only with this operation, engagement between the fitting projections 40h and 41h and the fitting portions 40i and 41i in each side of the frame are released cooperatively at substantially the same time. That is, the first frame portion 40a and the second frame portion 40b that fit each other while holding the filter 32 may be opened in a single operation. Therefore, the unclean filter 32 may be removed from the filter frame 40 and replaced easily and in a short time without releasing engagement between the fitting projections 40h, 41h and the fitting portions 40i, 41i one by one.

As described above with reference to FIGS. 9A to 9C, a new filter 32 is installed in the filter frame 40, and the dust collecting filter 31 is completed. Then the dust collecting filter 31 is re-installed in the filter case 40k.

Figure 3B:
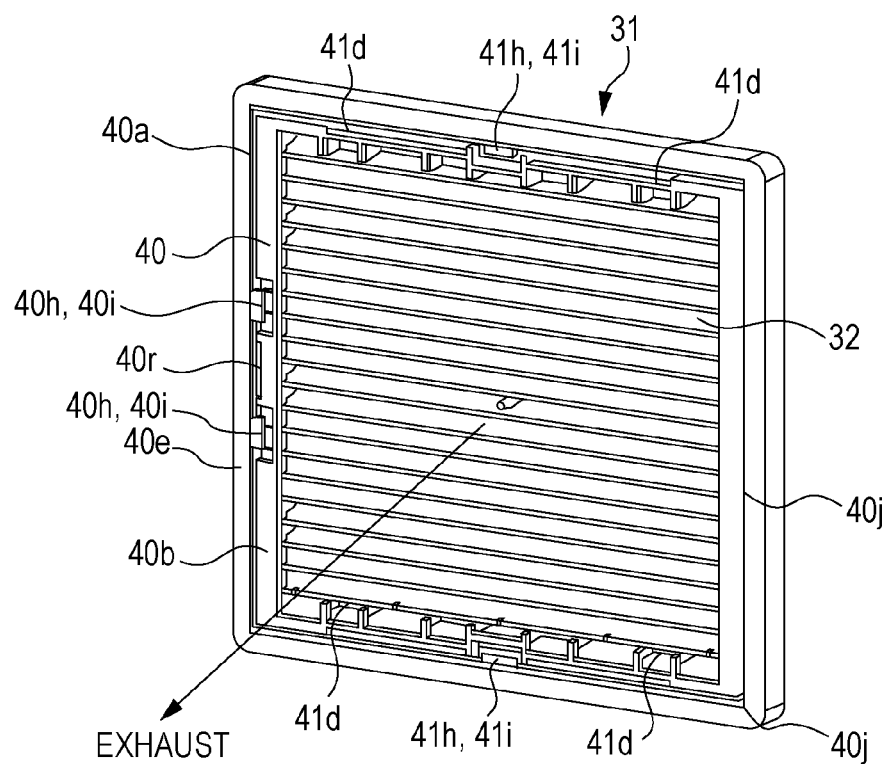
FIG. 3B is a perspective view, seen from the front, of a dust collecting filter in a state in which a gap filling member is provided on an outer peripheral surface.

Here, as described above with reference to FIG. 7B, the hinge portion 40j is provided on an upper portion of the outer peripheral surface of the first frame portion 40a in a thickness direction to a peripheral frame. Therefore, since the hinge portion 40j does not protrude from the outer peripheral surface of the first frame portion 40a when installing and replacing the filter 32, the hinge portion 40j does not interfere with the gap filling member 40e as illustrated in FIGS. 3A and 3B. Thus, when installing and replacing the filter 32, it is possible to save labor and time of removing and re-installing the gap filling member 40e.

The configuration of the dust collecting filter 35 of the embodiment described above is summarized as follows. The filter 32 is retained by being held between the first frame portion 40a having the filter installation surface 40c and the second frame portion 40b having the filter press portion 40d.

The fitting projections 40h and 41h, and the fitting portions 40i and 41i are provided in all the sides of the frame other than the side in which the first frame portion 40a and the second frame portion 40b are connected by the hinge portion 40j. With this configuration in which closing the frame portions and fitting the frame portions by the projections are performed at the same time, operability in closing the frame portions when the filter is installed has been improved.

In the first frame portion 40a, the arm 40q is provided in the filter installation surface 40c so as to extend between the fitting projections 41h provided in the two facing sides of the frame extending vertically to the hinge portion 40j from both longitudinal end portions of the side of the frame in which the hinge portion 40j is provided. In the second frame portion 40b, in the side of the frame facing the side in which the hinge portion 40j is provided, the cutout 40r is provided near the fitting portion 40i located in this side of the frame.

To replace the filter, engagement between the first frame 40a and the second frame 40b is released by inserting, for example, a tip of a screwdriver, tweezers, and a finger in the cutout 40r, and applying force to the first frame portion 40a to open the second frame 40b. Then, fitting of the fitting projections 40n near the cutout 40r is released and, further, the fitting projections 41h in other sides are released cooperatively.

That is, the first frame portion 40a and the second frame portion 40b that fit each other while holding the filter 32 may be opened in a single operation. Therefore, the operation to open the filter frame 40 is simplified and the unclean filter 32 is easily removed from the frame 40. That is, operability in opening/closing of the filter frame 40 at the time of installation or replacement of the filter 32 may be improved, and operation time may be shortened.

In the above embodiment, the dust collecting filter 31 is disposed at the exhaust duct of the image forming apparatus, but the dust collecting filter according to the present invention is not limited to the same and is effective as a dust collecting filter configuration disposed in various apparatuses.

In the present embodiment, the fitting projections 40h are provided in the first frame portion 40a. However, the fitting projections may be provided in the second frame portion and the fitting portions may be provided in the first frame portion. Further, it is only necessary that the cutout is provided in only one of the first frame portion and the second frame portion.

According to the present invention, a dust collecting filter with improved operability in opening/closing of a filter frame may be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-072123, filed Mar. 31, 2014, which is hereby incorporated by reference herein in its entirety.

What is claimed is:

1. A filter frame for containing a dust collecting filter, comprising:
    a first frame portion, including a filter installation surface on which the filter is installed, and a first side surface standing up from a first side of the installation surface and a second side surface standing up from a second side opposing the first side of the installation surface and a third side surface standing up from a third side connecting the first side and the second side of the installation surface and a fourth side surface standing up from a fourth side opposing the third side of the installation surface, configured to form a containing portion that contains the filter, wherein the filter installation surface has an opening through which a first surface of the filter is exposed;
    a second frame portion configured to sandwich the filter with first frame portion, wherein the second frame portion has an opening through which a second surface of the filter is exposed;
    a connecting portion, provided on the fourth side surface, configured to connect the first frame portion and the second frame portion so as to be openable, closable;
    a first latching portion, provided on the first side surface, configured to latch the first frame portion and the second frame portion when the filter frame is closed,
    wherein the first latching portion is released when the first side surface is bent in an outside direction;
    a second latching portion, provided on the second side surface, configured to latch the first frame portion and the second frame portion when the filter frame is closed,
    wherein the second latching portion is released when the second side surface is bent in an outside direction;
    a third latching portion, provided on the third side surface, configured to latch the first frame portion and the second frame portion when the filter frame is closed,
    wherein the third latching portion is released when the third side surface is bent in an outside direction;
    a clearance portion provided between the third side surface and the second frame portion when the filter frame is closed,
    wherein it is accessible from the clearance portion to an inner surface of the third side surface; and
    an arm configured to connect the first side of the filter installation surface and the second side of the filter installation surface,
    wherein the arm connects a first position corresponding to the first latching portion and a second position corresponding to the second latching portion.

2. The filter frame according to claim 1, wherein the arm is provided on a line connecting the first latching portion and the second latching portion.

3. The filter frame according to claim 1, further comprising:
    a recess portion provided in either one of the third side surface or the second frame portion, configured to form the clearance portion.

4. The filter frame according to claim 3, wherein the recess portion is provided at a substantially central portion of the third side surface, and the couple of latching portions are located at symmetrical positions on both sides of the recess portion.

5. The filter frame according to claim 3, wherein positions at which the first latching portion and the second latching portion are provided are symmetrical to a line that passes through the recess and perpendicularly crosses the third side surface.

6. The filter frame according to claim 1, further comprising, a positioning projection configured to position the filter, wherein the positioning projection penetrates the filter to install and position the same.

7. The filter frame according to claim 1, wherein the filter is a sheet-shaped member that is pleated.

8. The filter frame according to claim 1, wherein the filter is a flat sheet-shaped member that is not pleated.

9. The filter frame according to claim 1, wherein the filter is made of nonwoven web.

10. The filter frame according to claim 1, wherein the filter frame is an injection molded product made of a plastic resin material.

11. The filter frame according to claim 1, wherein the third latching portion is a couple of latching portions provided on a different position in a longitudinal direction of the third side surface,
    wherein the recess portion is provided between the couple of the latching portions.

* * * * *